United States Patent
Schoenek et al.

(10) Patent No.: US 8,998,760 B2
(45) Date of Patent: Apr. 7, 2015

(54) DUAL DAMPER ISOLATION FOR A MOTOR VEHICLE HYBRID POWERTRAIN

(75) Inventors: Norman Schoenek, Novi, MI (US); Hong Yang, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 525 days.

(21) Appl. No.: 13/315,072

(22) Filed: Dec. 8, 2011

(65) Prior Publication Data

US 2012/0178567 A1 Jul. 12, 2012

Related U.S. Application Data

(60) Provisional application No. 61/432,176, filed on Jan. 12, 2011.

(51) Int. Cl.
*F16H 3/72* (2006.01)
*F16H 3/66* (2006.01)
*B60K 6/383* (2007.10)
*B60K 6/48* (2007.10)

(52) U.S. Cl.
CPC *F16H 3/66* (2013.01); *B60K 6/383* (2013.01); *B60K 6/48* (2013.01); *F16H 2200/0052* (2013.01); *F16H 2200/201* (2013.01); *F16H 2200/2043* (2013.01); *F16H 2200/2082* (2013.01); *B60K 2006/4825* (2013.01); *Y02T 10/6221* (2013.01); *Y02T 10/6252* (2013.01)

(58) Field of Classification Search
CPC ............ F16H 3/72; F16H 2200/0052; F16H 2200/2043; F16H 2200/2082; B60K 6/383; B60K 2006/4825
USPC .......................................... 475/278, 285, 289
See application file for complete search history.

(56) References Cited

U.S. PATENT DOCUMENTS

| 7,052,430 | B2 * | 5/2006 | Stevenson et al. | 475/278 |
| 7,258,647 | B2 * | 8/2007 | Shim | 475/278 |
| 2005/0079942 | A1 | 4/2005 | Bauknecht et al. | |
| 2005/0079945 | A1 * | 4/2005 | Wittkopp | 475/271 |
| 2011/0048836 | A1 * | 3/2011 | Robinette et al. | 180/300 |
| 2011/0240430 | A1 * | 10/2011 | Iwase et al. | 192/3.29 |

FOREIGN PATENT DOCUMENTS

CN 1971090 A 5/2007

* cited by examiner

*Primary Examiner* — Justin Holmes
*Assistant Examiner* — Stacey Fluhart

(57) ABSTRACT

A hybrid transmission has an input member, an output member, three planetary gear sets, a plurality of coupling members and a plurality of torque transmitting devices. Each of the planetary gear sets includes first, second and third members. The torque transmitting devices include clutches and brakes. The input member is driven by an internal combustion engine and an electric motor.

16 Claims, 2 Drawing Sheets

DUAL DAMPER ISOLATION FOR A MOTOR VEHICLE HYBRID POWERTRAIN

CROSS-REFERENCE TO RELATED APPLICATIONS

Figure 1:
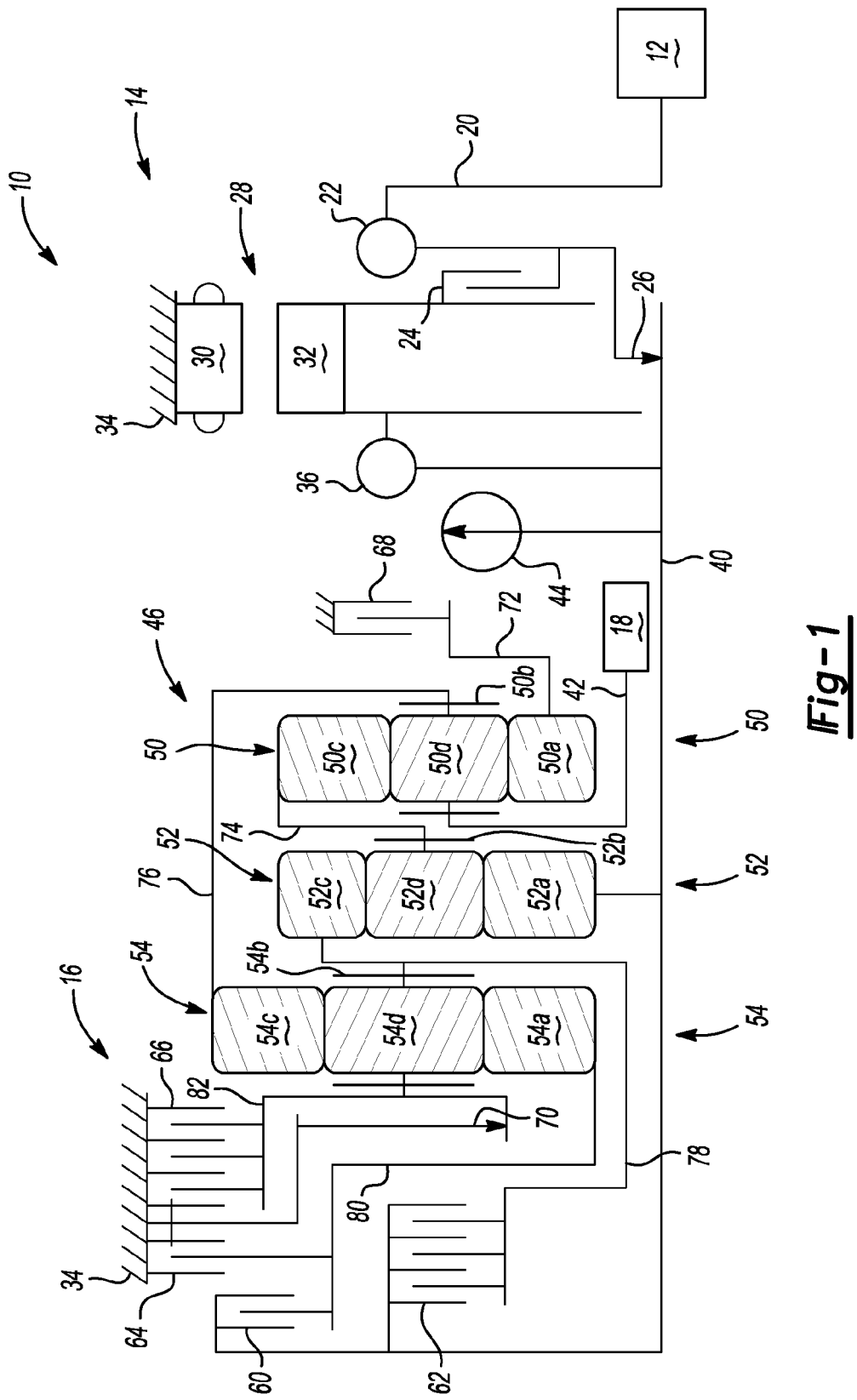

This application claims the benefit of U.S. Provisional Application No. 61/432,176, filed on Jan. 12, 2011, which is herein incorporated by reference in its entirety.

FIELD

The present disclosure relates to a motor vehicle hybrid powertrain having two dampers and more particularly to a motor vehicle hybrid powertrain having an electric motor starting device with dual dampers.

BACKGROUND

The statements in this section merely provide background information related to the present disclosure and may or may not constitute prior art.

Extensive engineering and design effort is currently directed to hybrid powertrains for motor vehicles, especially passenger cars. One of the most promising and active areas involves the addition of an electric motor and associated electronic controller to a motor vehicle powertrain to supplement torque for launches in order that a smaller internal combustion engine may be utilized in the vehicle. Lower horsepower and smaller displacement engines routinely provide improved fuel economy over larger engines and, when supplemented by an electric motor for vehicle launch, provide entirely satisfactory overall performance.

Accordingly, many hybrid powertrains begin as adaptations of conventional and existing powertrains utilizing an internal combustion engine and a transmission having a torque converter and multiple planetary gear assemblies. Into this powertrain is added an electric motor and an appropriate launch and disconnect clutch. Frequently, the torque converter is removed. The addition is not without significant challenges, including variable torque oscillations during engine stop-start and engine steady state operation.

The present invention is directed to system for a hybrid powertrain which addresses and solves the above-delineated challenges.

SUMMARY

A hybrid powertrain having dual dampers for a motor vehicle is provided. The hybrid powertrain includes an engine and an electric motor coupled to a transmission. A first damper is located between the engine and the electric motor and a second damper is located between the electric motor and the transmission. The first damper is tuned to partially absorb torque oscillations from the engine during stop-start operating conditions. The second damper is tuned to partially absorb torque oscillations from the engine and the electric motor during steady-state operating conditions.

In an embodiment of the present invention, a hybrid transmission is provided. The hybrid transmission has an input member, an output member, first, second, and third planetary gear sets each having a sun gear, a carrier member and a ring gear. Additionally, a first interconnecting member continuously interconnects the ring gear of the first planetary gear set with the carrier member of the second planetary gear set, a second interconnecting member continuously interconnects the carrier member of the first planetary gear set and the output member with the ring gear of the third planetary gear set, a third interconnecting member continuously interconnects the ring gear of the second planetary gear set with the carrier member of the third planetary gear set.

In yet another embodiment of the present invention, the hybrid transmission has a first clutch that is selectively engageable to interconnect the sun gear of the second planetary gear set with the sun gear of the third planetary gear set.

In yet another embodiment of the present invention, the hybrid transmission has a second clutch that is selectively engageable to interconnect the sun gear of the second planetary gear set with the ring gear of the second planetary gear set and the carrier member of the third planetary gear set.

In yet another embodiment of the present invention, the hybrid transmission has a one-way clutch that is selectively engageable to interconnect the ring gear of the second planetary gear set and the carrier member of the third planetary gear set with the stationary member.

In yet another embodiment of the present invention, the hybrid transmission has a first brake that is selectively engageable to interconnect the sun gear of the third planetary gear set with a stationary member.

In yet another embodiment of the present invention, the hybrid transmission has a second brake that is selectively engageable to interconnect the ring gear of the second planetary gear set and the carrier member of the third planetary gear set with the stationary member.

In yet another embodiment of the present invention, the hybrid transmission has a third brake that is selectively engageable to interconnect the sun gear of the first planetary gear set with the stationary member.

In still another embodiment of the present invention, the hybrid transmission has a first damper that is continuously interconnected with the engine. The first damper has a spring rate of approximately 10 Nm/deg to about 30 Nm/deg in a the first stage and a spring rate of approximately 50 Nm/deg in a second stage and a hysteresis between about 9 Nm and about 20 Nm.

In still another embodiment of the present invention, the hybrid transmission has a one-way clutch for selectively interconnecting the first damper with the input member;

In still another embodiment of the present invention, the hybrid transmission has a second damper that is continuously interconnected to the input member and the first member of the second planetary gear set. The second damper has a spring rate of approximately 20 Nm/deg to about 40 Nm/deg and a hysteresis between about 50 Nm and about 110 Nm.

In still another embodiment of the present invention, the hybrid transmission has an electric motor that is continuously interconnected to the second damper to provide a driving torque to the input member.

In still another embodiment of the present invention, the hybrid transmission has a disconnect clutch for selectively interconnecting the first damper to the electric motor.

In still another embodiment of the present invention, the hybrid transmission has a hydraulic pump that is continuously interconnected with the input member. The hydraulic pump supplies a pressurized hydraulic fluid to the transmission, In still another embodiment of the present invention, the clutches and the brakes are selectively engageable in combinations of at least two to establish a plurality of forward speed ratios and at least one reverse speed ratio between the input member and the output member.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
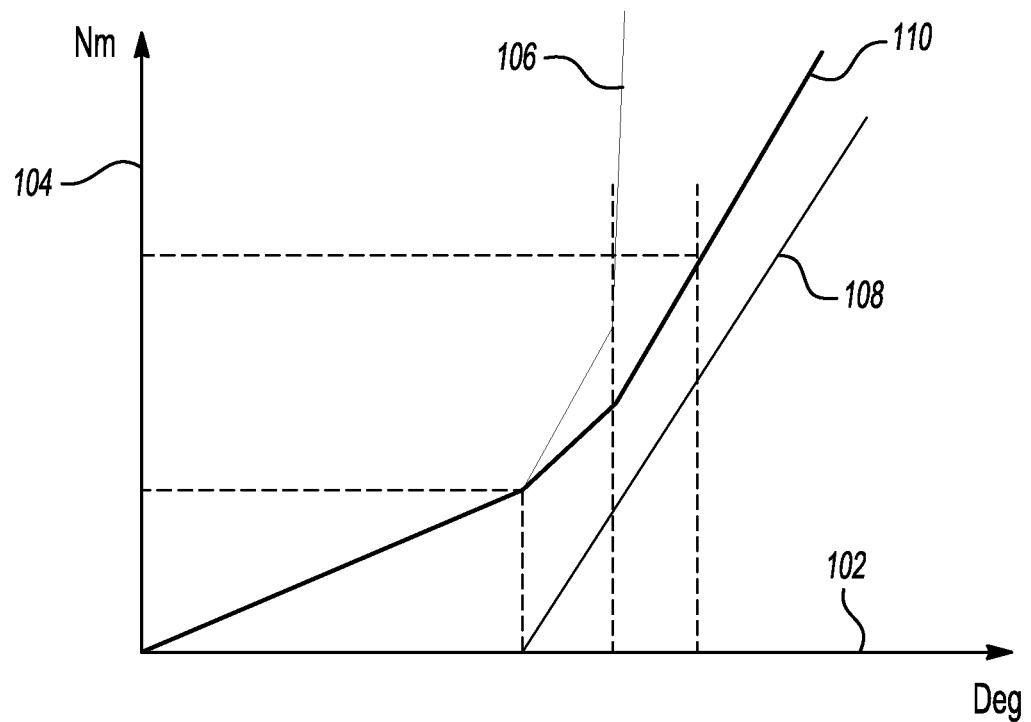

FIG. 1 is a diagrammatic view of an embodiment of a powertrain for a motor vehicle; and FIG. 2 is a graph illustrating rotation of a first and a second damper with respect to an engine load.

DETAILED DESCRIPTION

The following description is merely exemplary in nature and is not intended to limit the present disclosure, application, or uses.

With reference to FIG. 1, an exemplary hybrid powertrain for a motor vehicle is generally indicated by reference number 10, in accordance with the present invention. The powertrain 10 includes an engine 12 and an electric motor module 14 that each independently supply a driving torque to a transmission 16. Transmission 16 establishes various gear or speed ratios to a final drive unit 18.

The engine 12 is a conventional internal combustion engine or an electric engine or combination thereof, or any other type of prime mover, without departing from the scope of the present disclosure. The engine 12 supplies a driving torque to a flexplate, flywheel or other connecting device 20. The flexplate 20 is coupled to the electric motor module 14.

The electric motor module 14 includes a first damper 22, a disconnect clutch 24, a one-way clutch 26, an electric motor 28 and a second damper 36. The first damper 22 is connected to the flexplate 20. The first damper 22 is configured to absorb a portion of torque oscillations transmitted through the flexplate 20 from the engine 12. The first damper 22 may take various forms and have various properties without departing from the scope of the present disclosure, for example, first damper 22 and flexplate 20 are combined to form a dual mass flywheel. The first damper 22 is connected to both the disconnect clutch 24 and to the one-way clutch 26. The disconnect clutch 24 is, in the example provided, a plate clutch that when applied transmits torque from the first damper 22 to the electric motor 28. However, it should be appreciated that various types of torque transmitting devices may be employed.

The electric motor 28 generally includes a stator 30 and a rotor 32. The stator 30 includes a plurality of windings or phases and is secured to a ground, stationary member, or a transmission housing 34. The rotor 32 includes a plurality of magnets and/or ferromagnetic members and is disposed radially inwardly of the stator 30. The rotor 32 is interconnected for common rotation with the disconnect clutch 24 and a second damper 36. The stator 30 and the rotor 32 may take various forms and have various properties without departing from the scope of the present disclosure. The second damper 36 is configured to absorb a portion of torque oscillations transmitted from the rotor 32 of the electric motor 28. The second damper 32 may take various forms and have various properties without departing from the scope of the present disclosure.

The first damper 22 is, in the example provided, a two-stage damper having four inner diameter straight springs. In addition, the first damper 22 is dry and is located external to the electric motor 28 and hydraulic fluid lubrication and cooling flow. The first damper 22 has a low spring rate, long travel, and low hysteresis tuned to isolate torque oscillations during steady-state engine 12 operation. For example, the first damper 22 has a spring rate of approximately 10 Nm/deg to about 30 Nm/deg in the first stage and a spring rate of approximately 50 Nm/deg in the second stage, a capacity of approximately 465 Nm in the first stage and a capacity of approximately 565 Nm in the second stage, and a hysteresis between about 9 Nm and about 20 Nm.

The second damper 36 is, in the example provided, a single-stage damper having four arc springs disposed on an outer diameter of the damper. The second damper 36 is located within the electric motor module 14. Accordingly, the second damper 36 is wet and subject to hydraulic fluid lubrication and cooling flow. The second damper 36 has a high spring rate, short travel, and high hysteresis as compared to the first damper 22 and tuned to isolate torque oscillations during stop-start of the engine 12. For example, the second damper 36 has a spring rate of approximately 20 Nm/deg to about 40 Nm/deg, a capacity of approximately 528 Nm, and a hysteresis between about 50 Nm and about 110 Nm.

Turning to FIG. 2, a graph illustrates the first and second dampers 22, 36 with respect to a combined damper effect (i.e. the combined effects of the first and second dampers 22, 36). The degree of rotation of the dampers 22, 36 is shown on the horizontal axis and indicated by reference number 102. The engine load in Nm is shown on the vertical axis and indicated by reference number 104. The first damper 22 is indicated by line 106. The second damper 36 is indicated by line 108. The combined damper effect is indicated by line 110. The increase in damper hysteresis can increase damper attenuation effect and reduce vibration during engine start and stop while the higher hysteresis torque increases the transmission rate of primary components from combustion during steady state engine operation.

Returning to FIG. 1, the transmission 16 generally includes a transmission input shaft 40, a transmission output shaft 42, a pump 44, and a clutch and gear arrangement 46. The transmission input shaft 40 is connected for common rotation with and is selectively driven by both the one-way clutch 26 and the second damper 36 of the electric motor module 14. In addition, the pump 44 is connected to and driven by the transmission input shaft 40. The pump 44 may be any positive displacement pump, such as a gerotor pump or a vane pump, operable to provide pressurized hydraulic fluid to both the transmission 16 and the electric motor module 14.

The gear and clutch arrangement 46 includes a plurality of planetary gear assemblies 50, 52, and 54 interconnected with a plurality of torque transmitting mechanisms 60, 62, 64, 66, 68, and 70. For example, the first planetary gear set 50 includes a sun gear member 50A, a planet gear carrier member 50B and a ring gear member 50C. The sun gear member 50A is connected for common rotation with a first shaft or interconnecting member 72. The ring gear member 50C is connected for common rotation with a second shaft or interconnecting member 74. The planet gear carrier member 50B rotatably supports a set of planet gears 50D (only one of which is shown) and is connected for common rotation with the transmission output shaft or member 42 and a third shaft or interconnecting member 76. The planet gears 50D are each configured to intermesh with both the sun gear member 50A and the ring gear member 50C.

The second planetary gear set 52 includes a sun gear member 52A, a planet carrier member 52B that rotatably supports a set of planet gears 52D and a ring gear member 52C. The sun gear member 52A is connected for common rotation with the transmission input shaft or member 40. The ring gear member 52C is connected for common rotation with a fourth shaft or interconnecting member 78. The planet carrier member 52C is connected for common rotation with the second shaft or interconnecting member 74. The planet gears 52D are each configured to intermesh with both the sun gear member 52A and the ring gear member 52C.

The third planetary gear set 54 includes a sun gear member 54A, a ring gear member 54C and a planet carrier member 54B that rotatably supports a set of planet gears 54D. The sun gear member 54A is connected for common rotation with a fifth shaft or interconnecting member 80. The ring gear member 54C is connected for common rotation with the third shaft or interconnecting member 76. The planet carrier member 54B is connected for common rotation with the fourth shaft or interconnecting member 78 and a sixth shaft or interconnecting member 82. The planet gears 54D are each configured to intermesh with both the sun gear member 54A and the ring gear member 54C.

The torque-transmitting mechanisms or clutches 60, 62 and brakes 64, 66, 68, 70 allow for selective interconnection of the shafts or interconnecting members, members of the planetary gear sets and the transmission housing. For example, the first clutch 60 is selectively engageable to connect the fifth interconnecting member 80 with the transmission input member 40. The second clutch 62 is selectively engageable to connect the fourth interconnecting member 78 with the transmission input member 40. The first brake 64 is selectively engageable to connect the fifth interconnecting member 80 to the stationary member or transmission housing 34 in order to restrict the member 80 from rotating relative to the stationary member or transmission housing 34. The second brake 66 is selectively engageable to connect the sixth interconnecting member 82 to the stationary member or transmission housing 34 in order to restrict the member 82 from rotating relative to the stationary member or transmission housing 34. The third brake 68 is selectively engageable to connect the first interconnecting member 72 to the stationary member or transmission housing 34 in order to restrict the member 72 from rotating relative to the stationary member or transmission housing 34. The fourth brake 70 is a one-way clutch that is selectively engageable to connect the sixth interconnecting member 82 to the stationary member or transmission housing 34 in order to restrict the member 82 from rotating relative to the stationary element or transmission housing 34 in a first rotational direction or at least one rotational direction.

The transmission output shaft or member 42 is preferably continuously connected with the final drive unit or transfer case 18. The final drive unit 18 may include a differential, trans-axles, and wheels (not shown) for providing a final output torque.

It will be appreciated that at least six forward speed ratios and one reverse speed ratio may be achieved through different combinations of clutch and brake engagement. Moreover, the description of the invention is merely exemplary in nature and variations that do not depart from the gist of the invention are intended to be within the scope of the invention. Such variations are not to be regarded as a departure from the spirit and scope of the invention.

The invention claimed is:

1. A hybrid powertrain having a transmission powered by an engine, the powertrain comprising:
   an input member;
   an output member;
   first, second, and third planetary gear sets each having first, second and third members, wherein the input member is continuously connected for common rotation with the first member of the second planetary gear set;
   a first interconnecting member continuously interconnecting the third member of the first planetary gear set with the second member of the second planetary gear set;
   a second interconnecting member continuously interconnecting the second member of the first planetary gear set and the output member with the third member of the third planetary gear set;
   a third interconnecting member continuously interconnecting the third member of the second planetary gear set with the second member of the third planetary gear set;
   six torque transmitting mechanisms selectively engageable to interconnect at least one of the first, second, and third members with at least another of the first, second, third members and a stationary member;
   a first damper continuously interconnected with the engine;
   a one-way clutch for selectively interconnecting the first damper with the input member;
   a second damper continuously interconnected to the input member;
   an electric motor continuously interconnected to the second damper to provide a driving torque to the input member;
   a disconnect clutch for selectively interconnecting the first damper to the electric motor; and
   a hydraulic pump continuously interconnected with the input member, wherein the hydraulic pump supplies a pressurized hydraulic fluid to the transmission,
   wherein the torque transmitting mechanisms are selectively engageable in combinations of at least two to establish a plurality of forward speed ratios and at least one reverse speed ratio between the input member and the output member and the first damper has a spring rate and a hysteresis that is lower than a spring rate and a hysteresis of the second damper.

2. The transmission of claim 1 wherein a first of the six torque transmitting mechanisms is selectively engageable to interconnect the input member and the first member of the second planetary gear set with the first member of the third planetary gear set.

3. The transmission of claim 2 wherein a second of the six torque transmitting mechanisms is selectively engageable to interconnect the first member of the second planetary gear set with the third member of the second planetary gear set and the second member of the third planetary gear set.

4. The transmission of claim 3 wherein a third of the six torque transmitting mechanisms is selectively engageable to interconnect the first member of the third planetary gear set with the stationary member.

5. The transmission of claim 4 wherein a fourth of the six torque transmitting mechanisms is selectively engageable to interconnect the third member of the second planetary gear set and the second member of the third planetary gear set with the stationary member.

6. The transmission of claim 5 wherein a fifth of the six torque transmitting mechanisms is selectively engageable to interconnect the first member of the first planetary gear set with the stationary member.

7. The transmission of claim 6 wherein a sixth of the six torque transmitting mechanisms is selectively engageable to interconnect the third member of the second planetary gear set and the second member of the third planetary gear set with the stationary member.

8. The transmission of claim 1 wherein the first member of the first planetary gear set, the first member of the second planetary gear set and the first member of the third planetary gear set are sun gears, the second members of the first, second and third planetary gear sets are carrier members and the third member of the first planetary gear set, the third member of the second planetary gear set and the third member of the third planetary gear set are ring gears.

9. The transmission of claim 1 wherein the electric motor has a stator connected to the stationary member and a rotor coupled the first member of the second planetary gear set.

10. The transmission of claim 1 wherein the first damper has a spring rate of approximately 10 Nm/deg to about 30 Nm/deg in a first stage and a spring rate of approximately 50 Nm/deg in a second stage, a capacity of approximately 465 Nm in the first stage and a capacity of approximately 565 Nm in the second stage, and a hysteresis between about 9 Nm and about 20 Nm.

11. The transmission of claim 1 wherein the second damper has a spring rate of approximately 20 Nm/deg to about 40 Nm/deg, a capacity of approximately 528 Nm, and a hysteresis between about 50 Nm and about 110 Nm.

12. A transmission driven by a flywheel connected to an output of an engine, the transmission comprising:
   an input member;
   an output member;
   first, second, and third planetary gear sets each having first, second and third members;
   a first interconnecting member continuously interconnecting the third member of the first planetary gear set with the second member of the second planetary gear set;
   a second interconnecting member continuously interconnecting the second member of the first planetary gear set and the output member with the third member of the third planetary gear set;
   a third interconnecting member continuously interconnecting the third member of the second planetary gear set with the second member of the third planetary gear set;
   a first torque transmitting mechanism selectively engageable to interconnect the first member of the second planetary gear set with the first member of the third planetary gear set;
   a second torque transmitting mechanism selectively engageable to interconnect the first member of the second planetary gear set with the third member of the second planetary gear set and the second member of the third planetary gear set;
   a third torque transmitting mechanism selectively engageable to interconnect the first member of the third planetary gear set with a stationary member;
   a fourth torque transmitting mechanism selectively engageable to interconnect the third member of the second planetary gear set and the second member of the third planetary gear set with the stationary member;
   a fifth torque transmitting mechanism selectively engageable to interconnect the third member of the second planetary gear set and the second member of the third planetary gear set with the stationary member;
   a sixth torque transmitting mechanism selectively engageable to interconnect the first member of the first planetary gear set with the stationary member;
   a first damper continuously interconnected with the engine, wherein the first damper has a first spring rate and a first hysteresis;
   a one-way clutch for selectively interconnecting the first damper with the input member;
   a second damper continuously interconnected to the input member and the first member of the second planetary gear set, wherein the second damper has a second spring rate that is greater than the first spring rate of the first damper and a second hysteresis that is greater than the first hysteresis of the first damper;
   an electric motor continuously interconnected to the second damper to provide a driving torque to the input member;
   a disconnect clutch for selectively interconnecting the first damper to the electric motor; and
   a hydraulic pump continuously interconnected with the input member, wherein the hydraulic pump supplies a pressurized hydraulic fluid to the transmission, and
   wherein the torque transmitting mechanisms are selectively engageable in combinations of at least two to establish a plurality of forward speed ratios and at least one reverse speed ratio between the input member and the output member.

13. The transmission of claim 12 wherein the first member of the first planetary gear set, the first member of the second planetary gear set and the first member of the third planetary gear set are sun gears, the second members of the first, second and third planetary gear sets are carrier members and the third member of the first planetary gear set, the third member of the second planetary gear set and the third member of the third planetary gear set are ring gears.

14. The transmission of claim 12 wherein the electric motor has a stator connected to the stationary member and a rotor coupled to the first member of the second planetary gear set.

15. The transmission of claim 12 wherein the first damper has a spring rate of approximately 10 Nm/deg to about 30 Nm/deg in a first stage and a spring rate of approximately 50 Nm/deg in a second stage, a capacity of approximately 465 Nm in the first stage and a capacity of approximately 565 Nm in the second stage, and a hysteresis between about 9 Nm and about 20 Nm.

16. The transmission of claim 12 wherein the second damper has a spring rate of approximately 20 Nm/deg to about 40 Nm/deg, a capacity of approximately 528 Nm, and a hysteresis between about 50 Nm and about 110 Nm.

* * * * *